Patented Jan. 7, 1936

2,026,986

UNITED STATES PATENT OFFICE 2,026,986

PREPARATION OF HIGH VISCOSITY MIXED ESTERS OF CELLULOSE

Carl J. Malm, Rochester, N. Y., assignor to Eastman Kodak Company, Rochester, N. Y., a corporation of New York No Drawing. Application May 1, 1935,
Serial No. 19,249

3 Claims. (Cl. 260—101)

The present invention relates to the preparation of high viscosity mixed esters of cellulose containing acetyl groups and groups of 3-4 carbon atoms in a bath in which the higher acyl is at least 40% of the total acyl content. This is accomplished by pretreating the cellulose with a mixture of acetic acid and a fatty acid of 3-4 carbon atoms and then supplying both acetic and higher fatty acid anhydride thereto for the esterification.

In the preparation of high viscosity esters of cellulose, it is especially desirable that the micellar structure of the cellulose be preserved as much as possible. In the preparation of cellulose acetate or cellulose mixed esters in a bath in which the acetyl groups predominate, the reactivity of the esterification mixture tends to promote the reaction without breaking down the micelle structure of the cellulose and the preparation of high viscosity esters without serious difficulty is possible.

When, however, it is desired to prepare a mixed ester of cellulose in a bath in which at least 40% of the total acyl consists of acyl of 3-4 carbon atoms, the esterifying bath will not be as effective, as the absorption of catalyst by the cellulose is comparatively low.

In order to obtain a smooth reaction in the esterification of cellulose, it is desirable to soften or activate the cellulose fibers by pretreatment. In the preparation of cellulose acetate-propionate or -butyrate in a bath having a high higher acyl content, it has been customary either to pretreat the fibers with propionic or butyric acid followed by the addition of acetic anhydride and the catalyst or to employ acetic acid in the pretreatment and propionic or butyric anhydride in the esterification. In the preparation of low viscosity esters, the conditions of esterification may be severe, so that the pretreatment with higher fatty acid or esterification with higher anhydride will be satisfactory.

However, in the preparation of the high viscosity esters it is essential that the conditions during the esterification be not severe else the micellar structure of the cellulose will be partially broken down and a low viscosity ester will result. With the mild conditions necessary, it is desirable that the cellulose be well activated in the pretreatment and that the esterification bath contain sufficiently active ingredients to assure substantial esterification.

When cellulose is pretreated with propionic or butyric acid, the fibers are not softened and rendered as reactive as when pretreated in a bath containing acetic acid. When cellulose is pretreated with acetic acid alone, higher anhydrides must predominate in the esterification bath to get a content of 40% of the acyl of radicals of 3-4 carbon atoms. This results in a slower reaction due to the lower reactivity of the higher anhydrides allowing the catalyst to degrade the cotton before it is protected by acyl groups.

I have found that the efficiency of the propionic or butyric acid pretreatment is markedly increased if part of the acid is replaced by acetic acid. I have found that with this pretreatment a mixture of propionic or butyric anhydride and a considerable amount of acetic anhydride may be employed in the esterification, thus giving a rapid reaction and preventing the catalyst from degrading the cellulose.

My process involves the preparation of high viscosity cellulose esters in a bath at least 40% of the acyl of which consists of acyl groups of 3-4 carbon atoms by pretreating the cellulose with a mixture of acetic acid and a fatty acid of 3-4 carbon atoms and then esterifying by adding acetic anhydride, an anhydride of a fatty acid of 3-4 carbon atoms and a catalyst thereto. The acid mixture which is employed to pretreat the cellulose, should contain at least 20% of acetic acid to give optimum results.

To give the esterification mixture sufficient higher acyl, a substantial amount of propionic or butyric anhydride should be employed in the esterification bath however in order to assure a fairly rapid esterification of the cellulose the acetic anhydride should constitute at least 20% of the anhydride present.

In the preparation of an ester having a very high content of acyl of 3-4 carbon atoms, it will be necessary that the acyl of the esterification mixture be made up of much less than 60% acetyl. This is accomplished by decreasing the ratio of acid to cotton in the pretreatment, and then adding propionic or butyric acid to the mass before the beginning of the esterification. In this way a pretreatment with a bath the acyl of which contains at least 20% acetyl and the use of acetic anhydride in an amount at least 20% of the total anhydride is possible and yet a high higher acyl content of the esterification bath is assured.

The following examples illustrate my invention:

*Example I.*—400 lbs. of refined cotton linters were treated with a mixture of 1200 lbs. of acetic acid and 800 lbs. of propionic acid for 4 hrs. at 100° F., 500 lbs. of 90% propionic anhydride and 800 lbs. of 85% acetic anhydride were added and the mixture was cooled to 50° F., whereupon a mixture of 740 lbs. of propionic acid, 45 lbs. of 90% propionic anhydride and 7200 cc. of sulfuric acid was added. The reaction was then carried out, the temperature not being allowed to rise above 80° F. A dope of very high viscosity was obtained in 8 hrs.

The ester was then hydrolyzed by adding 1000 lbs. of 50% acetic acid and the solution was kept at 100° F. for 14 hours. The ester was precipitated by slowly pouring the dope into 45% acetic acid. It was washed, dried and analyzed. It was found to have a content of 29.5% acetyl and 16% propionyl.

*Example II.*—400 lbs. of refined cotton linters were treated with a mixture of 1200 lbs. of acetic acid and 800 lbs. of butyric acid for 4 hrs. at 100° F., 500 lbs. of 90% butyric anhydride and 800 lbs. of 85% acetic anhydride were added and the mixture was cooled to 50° F., whereupon a mixture of 740 lbs. of butyric acid, 45 lbs. of 90% butyric anhydride and 7200 cc. of sulfuric acid was added. The reaction was then carried out, the temperature not being allowed to rise above 80° F. A dope of very high viscosity was obtained in 8 hrs.

The ester was then hydrolyzed by adding 1000 lbs. of 50% acetic acid and the solution was kept at 100° F. for 14 hours. The ester was precipitated by slowly pouring the dope into 45% acetic acid. It was washed, dried and analyzed. It was found to have a content of 29.5% acetyl and 15.5% butyryl.

*Example III.*—450 lbs. of cotton were pretreated by adding a mixture of 1500 lbs. of propionic acid, 500 lbs. of acetic acid and 25 lbs. of water and allowing to stand for 4 hrs. at 100° F. 1300 lbs. of 90% propionic anhydride and 450 lbs. of acetic anhydride were then added and the mixture was cooled to 45° F. A mixture of 750 lbs. of propionic acid and 8,000 cc. of sulfuric acid which had been cooled to 45° F. was then added. The temperature was then allowed to rise during the course of 6 hrs. to a maximum of 80° F. where it was kept until a clear highly viscous dope, free from grain, was obtained.

The ester was then hydrolyzed by adding 1000 lbs. of 50% acetic acid to the dope and allowing it to stand for 100 hrs. at 100° F. The ester was then precipitated out, washed, dried and analyzed as in the preceding example. It was found to have a propionyl content of 32% and an acetyl content of 10%.

The high viscosity mixed esters of cellulose containing substantial proportions of acyl groups of 3-4 carbon atoms are especially valuable for forming sheets of high flexibility, which may be employed in the manufacture of photographic film, thin sheeting and the like.

I claim:

1. The preparation of a high viscosity mixed ester of cellulose containing acetyl and acyl groups of 3-4 carbon atoms in a bath in which the acyl groups of 3-4 carbon atoms comprise at least 40% of the total acyl therein which comprises pretreating cellulose with a mixture of acetic acid and a fatty acid of 3-4 carbon atoms, the former comprising at least 20% of the mixture and then esterifying it in a bath containing a catalyst and a mixture of the anhydride of a fatty acid of 3-4 carbon atoms and acetic anhydride, the latter comprising at least 20% of the anhydride present.

2. The preparation of a high viscosity mixed ester of cellulose containing acetyl and propionyl groups in a bath in which the propionyl groups comprise at least 40% of the total acyl therein which comprises pretreating cellulose with a mixture of acetic acid and propionic acid the former comprising at least 20% of the mixture and then esterifying it in a bath containing a catalyst and a mixture of the anhydride of propionic acid and acetic anhydride, the latter comprising at least 20% of the anhydride present.

3. The preparation of a high viscosity mixed ester of cellulose containing acetyl and butyryl groups in a bath in which the butyryl groups comprise at least 40% of the total acyl therein which comprises pretreating cellulose with a mixture of acetic acid and butyric acid, the former comprising at least 20% of the mixture and then esterifying it in a bath containing a catalyst and a mixture of the anhydride of butyric acid and acetic anhydride, the latter comprising at least 20% of the anhydride present.

CARL J. MALM.